US010696569B2

(12) United States Patent
Sherzer (10) Patent No.: US 10,696,569 B2
(45) Date of Patent: Jun. 30, 2020

(54) WATER DESALINATION SYSTEM (75) Inventor: David Sherzer, Omer (IL)

(73) Assignee: UET-INDUSTRIAL WATER RECYCLING LTD., Omer (IL)

(*) Notice: Subject to any disclaimer, the term of this patent is extended or adjusted under 35 U.S.C. 154(b) by 934 days.

(21) Appl. No.: 14/115,828

(22) PCT Filed: May 2, 2012

(86) PCT No.: PCT/IL2012/000185
§ 371 (c)(1),
(2), (4) Date: Feb. 18, 2014

(87) PCT Pub. No.: WO2012/150593
PCT Pub. Date: Nov. 8, 2012

(65) Prior Publication Data
US 2014/0183109 A1 Jul. 3, 2014

(30) Foreign Application Priority Data

May 5, 2011 (IL) .......................................... 212746

(51) Int. Cl.
C02F 1/44 (2006.01)
C02F 9/00 (2006.01)
(Continued)

(52) U.S. Cl.
CPC ............... *C02F 1/441* (2013.01); *C02F 9/00* (2013.01); C02F 1/008 (2013.01); C02F 1/461 (2013.01); C02F 1/66 (2013.01); C02F 2103/08 (2013.01); C02F 2201/005 (2013.01); C02F 2201/4617 (2013.01); C02F 2209/003 (2013.01);
(Continued)

(58) Field of Classification Search
None
See application file for complete search history.

(56) References Cited

U.S. PATENT DOCUMENTS 5,788,826 A * 8/1998 Nyberg ................. B01J 47/08
204/536
7,374,694 B2 5/2008 Gaudinot et al.
(Continued)

FOREIGN PATENT DOCUMENTS

CA         2656465 A1 * 12/2007 .............. C02F 1/463
WO     2010/012691          2/2010
WO     2010/122336        10/2010

*Primary Examiner* — Krishnan S Menon
*Assistant Examiner* — Brad Gordon
(74) *Attorney, Agent, or Firm* — Mark M. Friedman (57) ABSTRACT In a system for generating potable water by water desalination using a reverse osmosis filter having a product outlet and a reject outlet, a system for re-mineralization of the potable water comprising two reactors comprising a first reactor and a second reactor, the two reactors configured to be used simultaneously, the first reactor for collecting lime or calcium carbonate from a stream out of the reject outlet in a first cycle, and for dispensing said collected lime or calcium carbonate to a permeate stream out of the product outlet in a second cycle; and the second reactor for dispensing lime or calcium carbonate into the permeate stream-in the first cycle and for collecting lime or calcium carbonate from a stream out of the reject outlet in the second cycle, wherein a DC voltage sufficient to separate the water into hydrogen (H+) ions and hydroxyl (OH−) ions is applied.

10 Claims, 10 Drawing Sheets (51) Int. Cl.
*C02F 1/00* (2006.01)
*C02F 103/08* (2006.01)
*C02F 1/66* (2006.01)
*C02F 1/461* (2006.01)

(52) U.S. Cl.
CPC .... *C02F 2209/005* (2013.01); *C02F 2209/06* (2013.01); *C02F 2209/40* (2013.01); *C02F 2303/04* (2013.01); *Y02A 20/131* (2018.01)

(56) References Cited

U.S. PATENT DOCUMENTS

| | | | |
|---|---|---|---|
| 7,771,599 B1 | 8/2010 | Choi et al. | |
| 7,887,696 B1 | 2/2011 | Simmonsy | |
| 7,922,900 B2 | 4/2011 | Hassan et al. | |
| 2002/0108906 A1* | 8/2002 | Husain | B01D 61/02 210/636 |
| 2002/0158018 A1* | 10/2002 | Abramowitz | A23L 2/52 210/639 |
| 2007/0108056 A1* | 5/2007 | Nyberg | B01D 61/44 204/554 |
| 2008/0230476 A1* | 9/2008 | Gilron | B01D 61/02 210/652 |
| 2010/0038260 A1* | 2/2010 | Sherzer | C02F 1/4602 205/742 |
| 2012/0043223 A1 | 2/2012 | Sherzer et al. | |

\* cited by examiner

WATER DESALINATION SYSTEM

CROSS-REFERENCE TO RELATED APPLICATIONS

The present application claims priority from patent application No. 212746 filed in Israel on May 2011 (May 95, 2011) and from application No. PCT/IL2012/000185.

STATEMENT REGARDING FEDERALLY SPONSORED RESEARCH OR DEVELOPMENT

None.

THE NAMES OF THE PARTIES TO A JOINT RESEARCH AGREEMENT

None.

REFERENCE TO A "SEQUENCE LISTING," A TABLE, OR A COMPUTER PROGRAM LISTING APPENDIX SUBMITTED

None.

BACKGROUND OF THE INVENTION

Field of the Invention

The present invention relates to systems for sea water desalination, and more specifically to systems for re-mineralization of the potable water.

Description of Related Art Including Information

References cited in the Written Opinion issued by ISA/US in application No. PCT/IL2012/000185:
U.S. Pat. No. 7,771,599 B1 CHOI et al.
U.S. Pat. No. 7,374,694 B2 GAUDINET et al.
WO 2010/012691 A1 GAID et al.
U.S. Pat. No. 7,922,900 B2 HASSAN et al.
WO 2010/122336 A2 AL-MAYAHI et al.

Reverse osmosis is now used in desalination of sea water. A problem with this process is that the resulting water (the permeate of the desalination processes) has too low a mineral concentration. This has undesirable effects, such as an accelerated corrosion processes between the water and the water pipes.

Furthermore, the water has a bad taste.

Accordingly, at present, after desalination the water has to undergo a process of re-mineralization.

The present solution is to quarry milestone rock, crush, grind and disinfect them and to load them into a filter. The permeate water that needs to be treated goes through a process of lowering the pH prior to the filtration process. This process allows the limestone to dissolve into the water.

Afterwards, obviously the pH should be corrected back to the drinking water pH standard.

Furthermore, the filters require periodic maintenance and replacement.

A typical desalination process contains 3 main water streams:

1. The feed stream to the desalination unit, which contains a wide range of minerals.

2. The desalination unit separated the feed water into 2 streams:
  a. Permeate stream—water with a very little minerals contents.
  b. Reject stream—water with a very high minerals contents.

BRIEF SUMMARY OF THE INVENTION

According to one aspect of the present invention, the minerals in the reject stream are used as a source of lime, instead of using limestone.

By implementing this aspect of the invention, there is no more need to quarry milestone rock, crush, grind and disinfect them and to load them into a filter.

There is no need to use re-mineralization filters, to maintain and replace these filters.

There is no need to lower the pH of the permeate water that needs to be treated, prior to the filtration; there is no need to restore the pH to its required level, after filtration.

According to another aspect of the invention, a pair of UET reactors (UET—Universal Environmental Technology) is simultaneously used in a continuous automated process: a first reactor collects lime from the reject stream; a second reactor dispenses lime into the permeate stream, to re-mineralize it.

After a certain time period, the functions of the reactors is interchanged: now the first reactor, which has already collected enough lime, is used to dispense it into the permeate stream; the second reactor, having been depleted of lime, is placed in the reject stream so it can collect lime again.

The process can continuously supply potable water, where the pair of UET reactors interchange functions cyclically.

A set of inlet valves guide the permeate stream to one reactor and the reject stream to the other reactor, or vice versa (during a subsequent cycle).

A set of outlet valves guide the output of one reactor to the system permeate out and the output of the other reactor to the system reject out, or vice versa (during a subsequent cycle).

According to yet another aspect of the invention, electrical energy is used to facilitate both processes: the collection of lime in one UET reactor, and the simultaneous dispensing of lime into the permeate water in the other reactor.

Furthermore, a different electrical connection is used in each case: For collecting lime, a DC (direct current) voltage is applied between an anode and a cathode in the; for dispensing lime, a DC voltage is applied across the cathode of the UET reactor.

This process allows the limestone to dissolve into the water.

The present invention therefore replaces the need for the limestone by putting UET's reactor in the reject stream and loading calcium-carbonate mainly on the cathode of the reactor. When the reactor is saturated, changing the stream direction by adjusting valves. The permeate stream goes through the calcium-carbonate in the reactor instead of passing through the limestone in the filter. The same effect will be achieved but without using limestone, without lowering the pH and fixing the pH after the filtration process.

Summarizing the Invention Process:

The concept of replacing the permeate stream treatment instead of using limestone with calcium carbonate in a solid form is described below:

a. Passing the reject stream through a separate designated UET reactor.

b. The reactor accumulates scale from the concentrated reject stream.

c. Once the reactor is "full" with scale, the permeate is directed to pass through the "full" reactor.

d. The permeate passing through the UET reactor dissolves the scale from the reactor into the permeate as a result of connecting the DC poles to the scale in a unique method designed by UET.

e. The non-dissolved minerals return to the permeate in a controlled process up to 0.2+ index according to the Langiler index.

f. When the reactor empties, the reactor position changes and returns to accumulate scale from the brine. The poles in UET's reactors change accordingly.

Further purposes and benefits of the current invention will become apparent upon reading the present disclosure and the related drawings.

DETAILED DESCRIPTION OF THE INVENTION

The current invention will now be described by way of example and with reference to the accompanying drawings.

Figure 1:
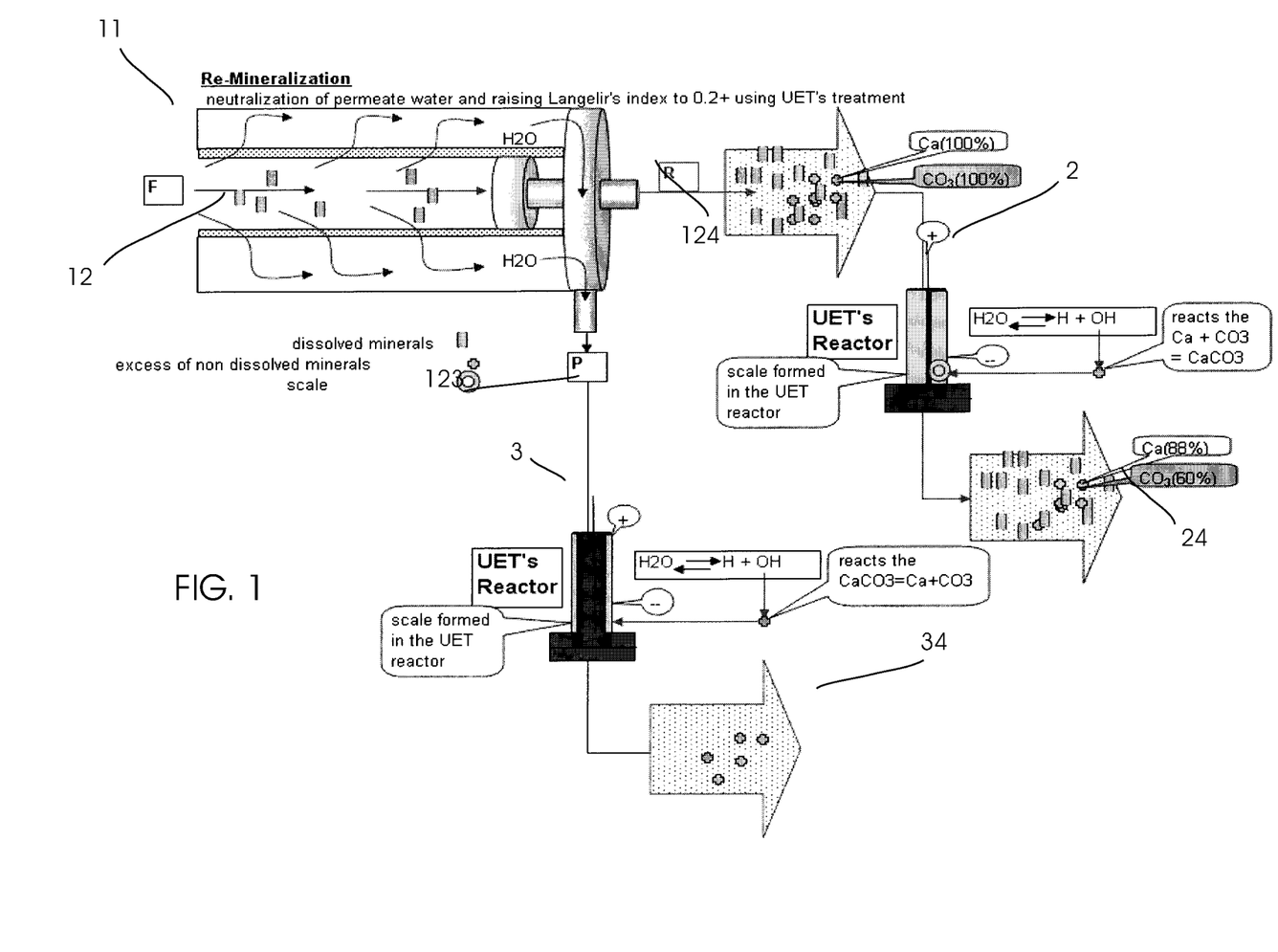
FIG. 1 details a desalination and re-mineralization apparatus

FIG. 1 details a desalination and re-mineralization apparatus, including a sea water inlet 11 coupled to a reverse osmosis filter 12. The results of filtering flow to a product water filter outlet 123 and a reject water filter outlet 124.

The system further uses an UET collection reactor 2 and an UET re-mineralization reactor 3.

Outputs from the system: a product water system outlet 34 (potable water) and a reject water system outlet 24.

FIG. 1 further illustrates and presents various details pertaining in the filtering and re-mineralization processes.

Figure 2:
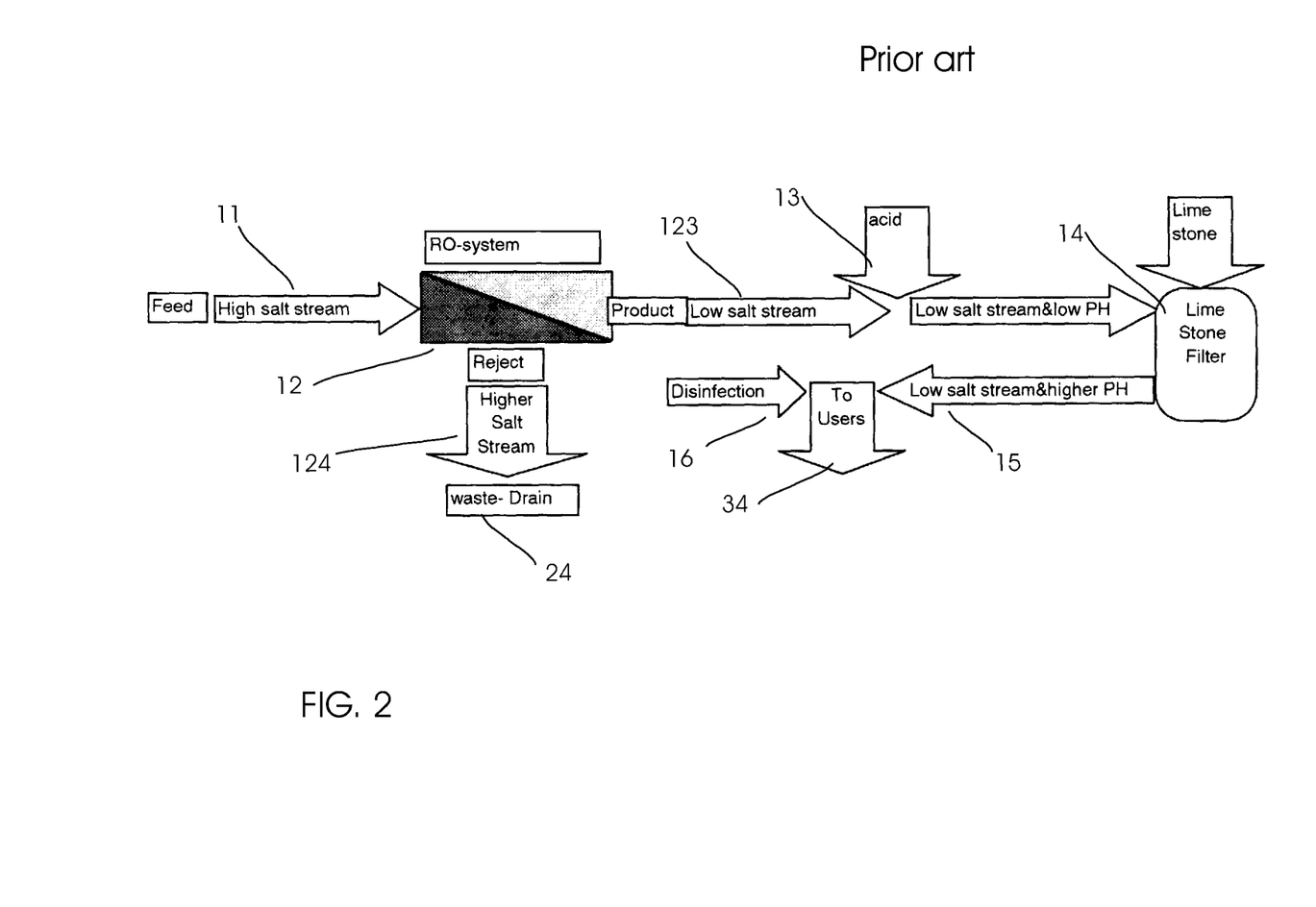
FIG. 2 details a prior art desalination and re-mineralization apparatus

FIG. 2 details a prior art desalination and re-mineralization apparatus.

A sea water inlet 11 is coupled to a reverse osmosis filter 12.

The reject water filter outlet 124 is left unused, it is coupled to a reject water system outlet 24 (waste-drain).

The product water filter outlet 123 is processed for lowering its pH, in system 13 (acid).

Limestone filter 14 is used for re-mineralization of the product water.

It is required to prepare, disinfect, load the lime stone into a filter, replace filter, etc.

Subsequently, it is required to restore the pH 15 which was previously lowered.

There is a disinfection 16 stage, then a potable water supply results, which is transferred to product water system outlet 34.

Figure 3:
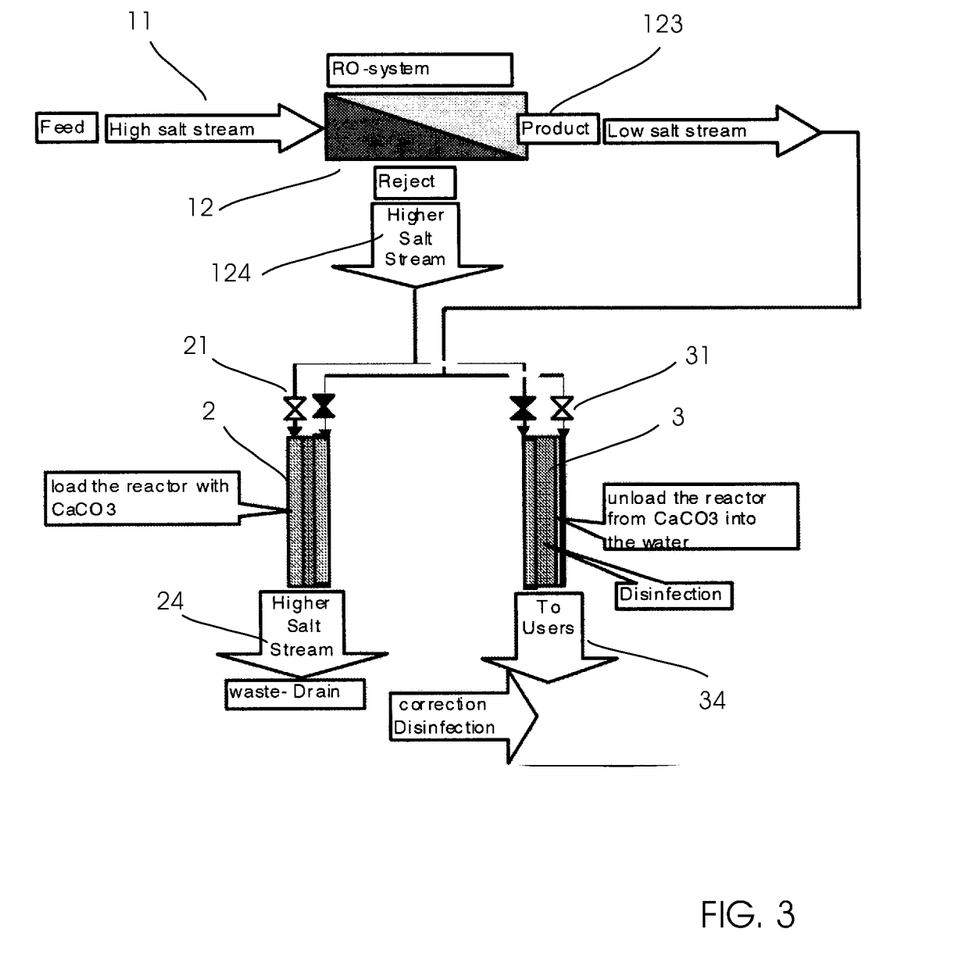
FIG. 3 details the new desalination and re-mineralization apparatus

FIG. 3 details the new desalination and re-mineralization apparatus.

Sea water input through the inlet 11 is coupled to a reverse osmosis filter 12. The filter has two outputs, a product water filter outlet 123 and a reject water filter outlet 124.

First reactor inlet valves 21 couple a first stream to the UET collection reactor 2 and therefrom to a reject water system outlet 24.

A second reactor inlet valves 31 couple a second stream to the UET re-mineralization reactor 3 and therefrom to a product water system outlet 34. Thus, the two UET reactors are used simultaneously, one to collect lime from the reject stream and the other to supply lime to the product stream.

UET's solution is based on two reactors or two sets of reactors. Each set contains a number of reactors according to the flow rate.

The pipelines that direct the streams to the reactors are equipped with valves. The position of the valves allows the reject to pass through the designated reactors and load them with calcium carbonate taken from the reject.

The reactors are activated by DC electricity. In each reactor there is an anode which receives a positive pole and the cathode which receives the negative pole.

The reject closes the circuit between the anode and the cathode and DC loop produces partial electrolysis. The partial electrolysis separated the water into two, H+ and OH.−

The OH− drives the calcium ions and the carbonate ions to react and form a solid compound calcium carbonate which settles on the cathode. The H+ drives the chlorides to react and form a dissolved compound of $Cl_2$. Gradually, the solid form of calcium carbonate on the cathode accumulated to the required amount. At this stage, the controller of the reactor acknowledges that it is saturated with calcium carbonate and changes the position of the valves. The new position of the valves direct the permeate stream into the loaded reactor. The poles in the reactor are directed to a position where the positive pole is connected to the upper part of the cathodes while the negative pole remains at the same connection point.

Figure 4:
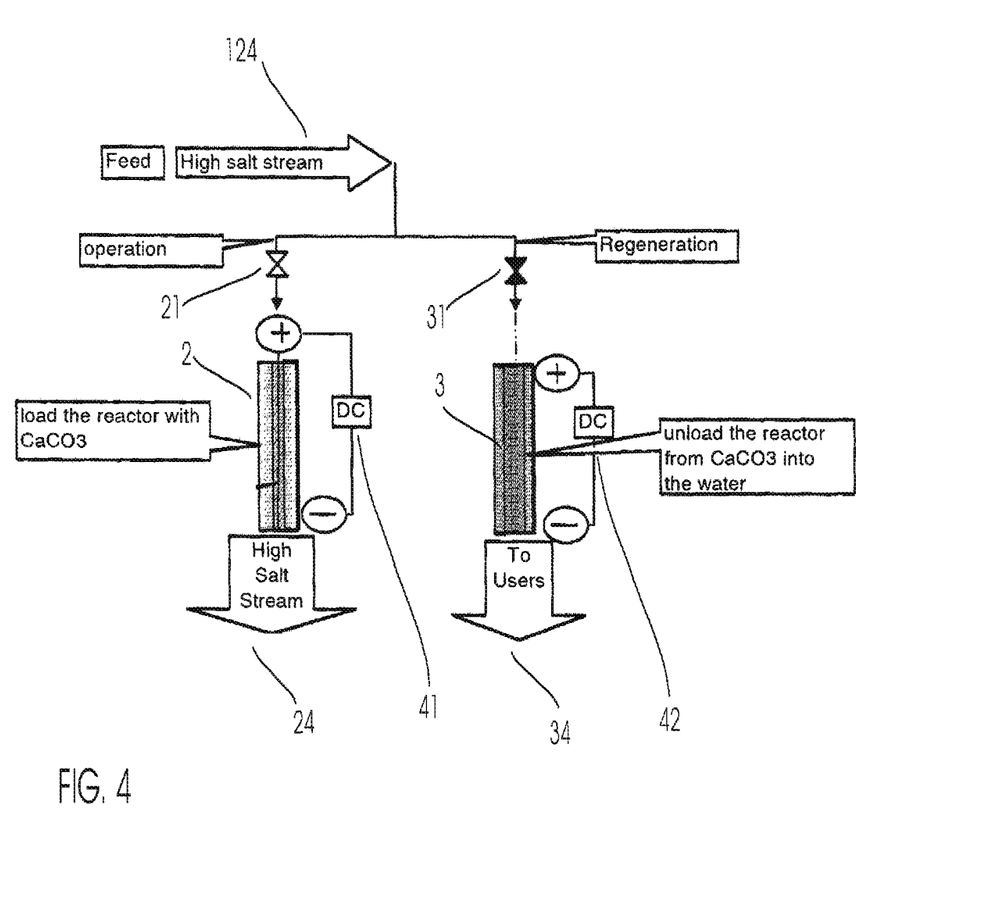
FIG. 4 illustrates the loading and unloading of the reactor with calcium carbonate

FIG. 4 illustrates the loading and unloading of the reactor with calcium carbonate, using electric power.

A first stream flowing through reject water filter outlet 124 is coupled through first reactor inlet valves 21 to an UET collection reactor 2;

the reactor 2 is connected to the electric energy supply 41. A DC voltage for loading CaCO3 is applied to reactor 2. Subsequently the stream is directed to a reject water system outlet 24.

A second stream flowing through second reactor inlet valves 31 is coupled to a UET re-mineralization reactor 3; the reactor 3 is connected to an electric energy supply 42. A DC voltage is supplied for unloading CaCO3 into the water. The resulting re-mineralized water is transferred to the product water system outlet 34.

Figure 5A:
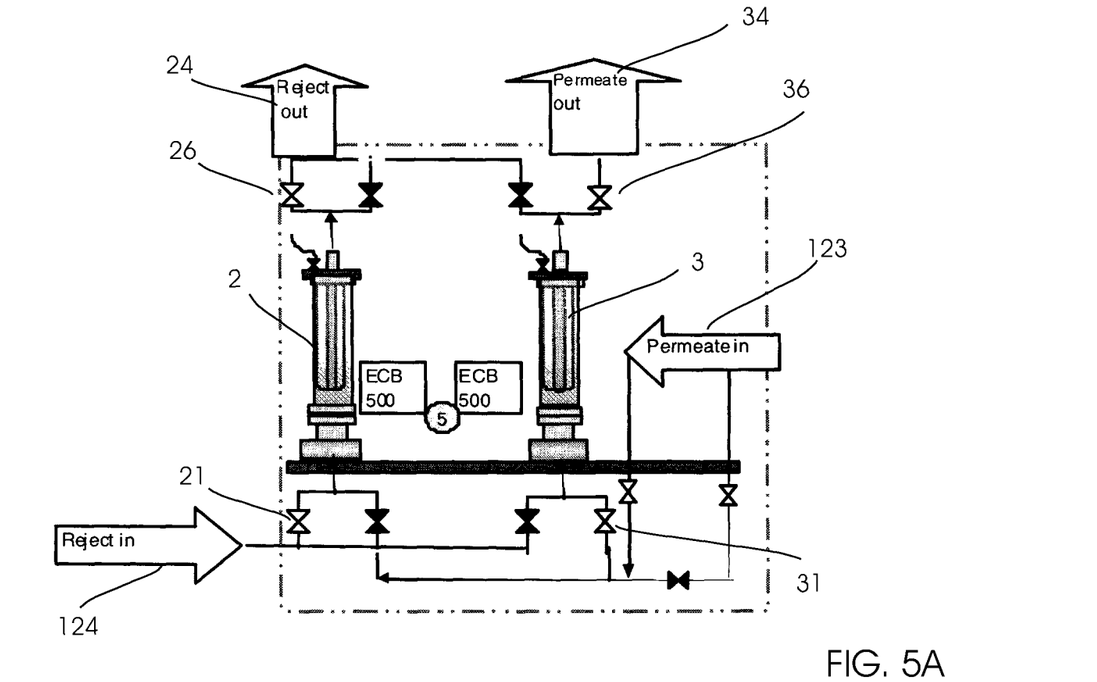
FIGS. 5A and 5B illustrate the simultaneous use of two reactors using inlet and outlet valves FIGS. 6A and 6B detail the simultaneous operation of two reactors FIGS. 7A and 7B detail the structure and operation of a reactor and the applied electric voltages.
Figure 5B:
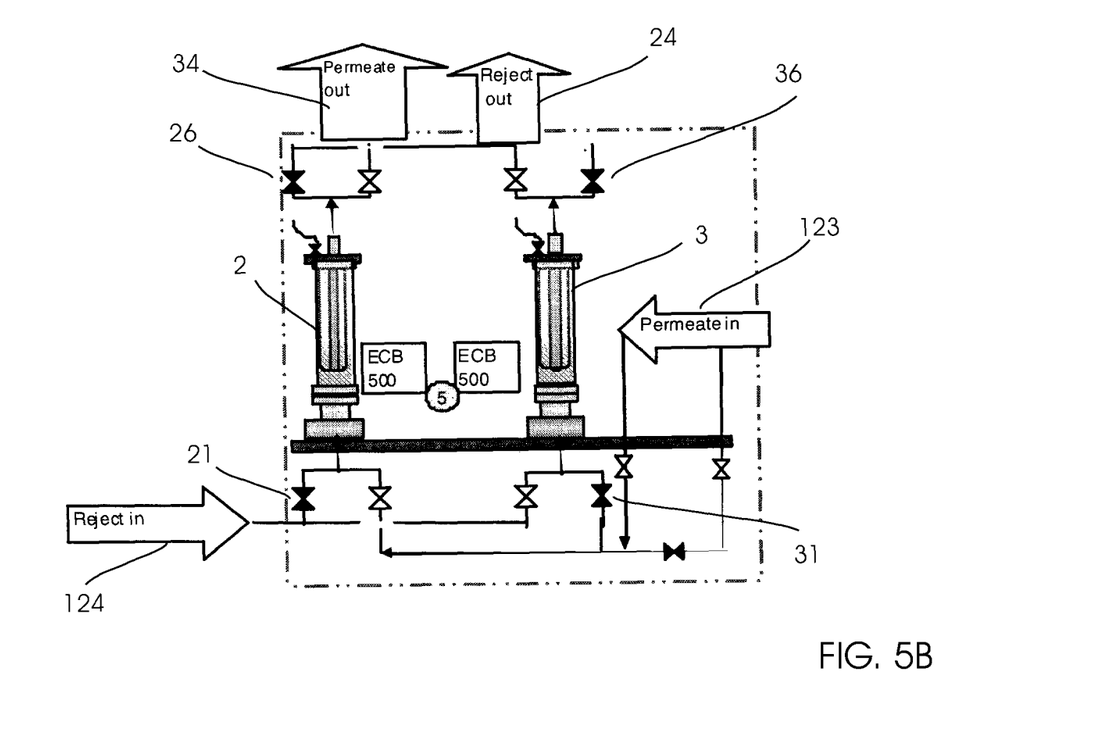

FIGS. 5A and 5B illustrate the simultaneous use of two reactors using inlet and outlet valves. In FIG. 5A a first stream flows:

from reject water filter outlet 124 to first reactor inlet valves 21,

UET collection reactor 2,
first reactor outlet valves 26,
reject water system outlet 24.
A second stream flows:
from product water filter outlet 123 to
second reactor inlet valves 31,
UET re-mineralization reactor 3,
second reactor outlet valves 36,
product water system outlet 34.
In FIG. 5B, the next cycle is illustrated:
A first stream flows from
product water filter outlet 123 to
first reactor inlet valves 21,
UET reactor 2, now used in a re-mineralization role,
first reactor outlet valves 26,
product water system outlet 34
A second stream flows from
reject water filter outlet 124 to
second reactor inlet valves 31,
UET reactor 3, now used in a collection role,
second reactor outlet valves 36,
reject water system outlet 24.

Figure 6A:
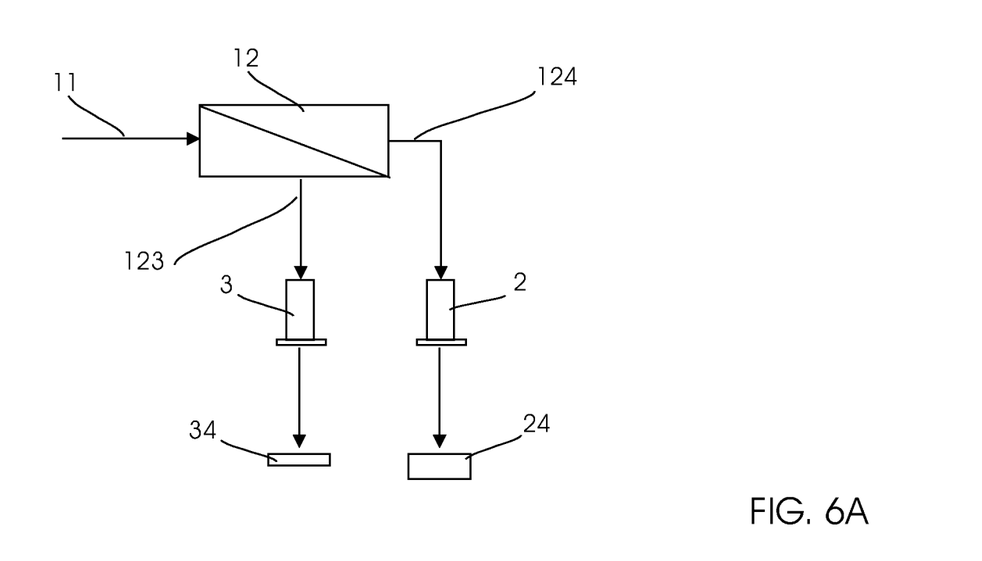
Figure 6B:
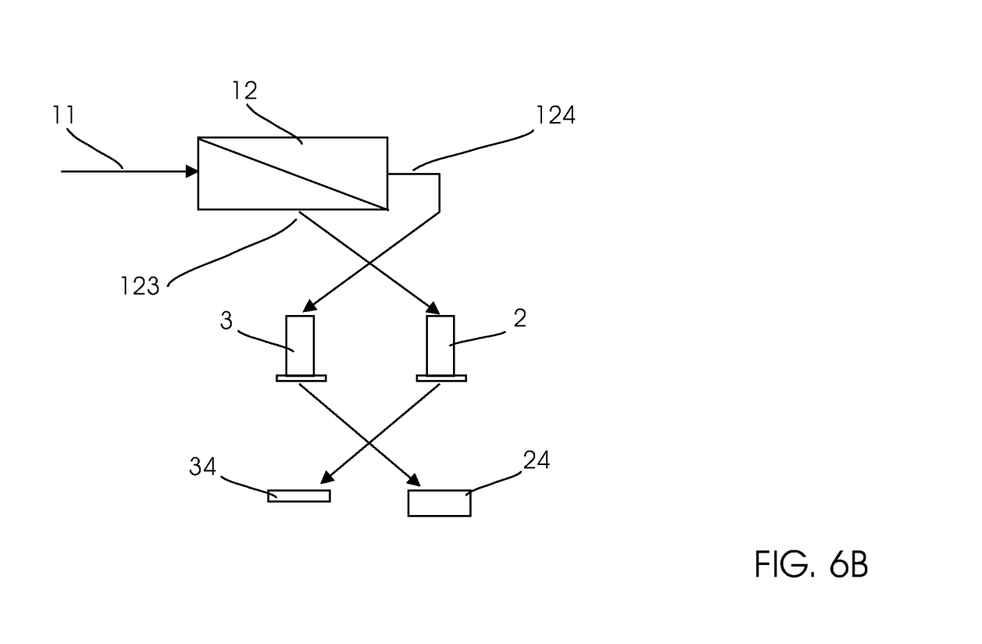

FIGS. 6A and 6B detail the simultaneous operation of two UET reactors
In FIG. 6A, one cycle:
A first stream flows from
product water filter outlet 123 to
UET re-mineralization reactor 3,
product water system outlet 34.
A second stream flows from
reject water filter outlet 124 to
UET collection reactor 2,
reject water system outlet 24.
In FIG. 6B, the next cycle:
A first stream flows from
product water filter outlet 123 to
UET reactor 2, now used in a re-mineralization role,
product water system outlet 34.
A second stream flows from
reject water filter outlet 124 to
UET reactor 3, now used in a collection role,
reject water system outlet 24.

Figure 7A:
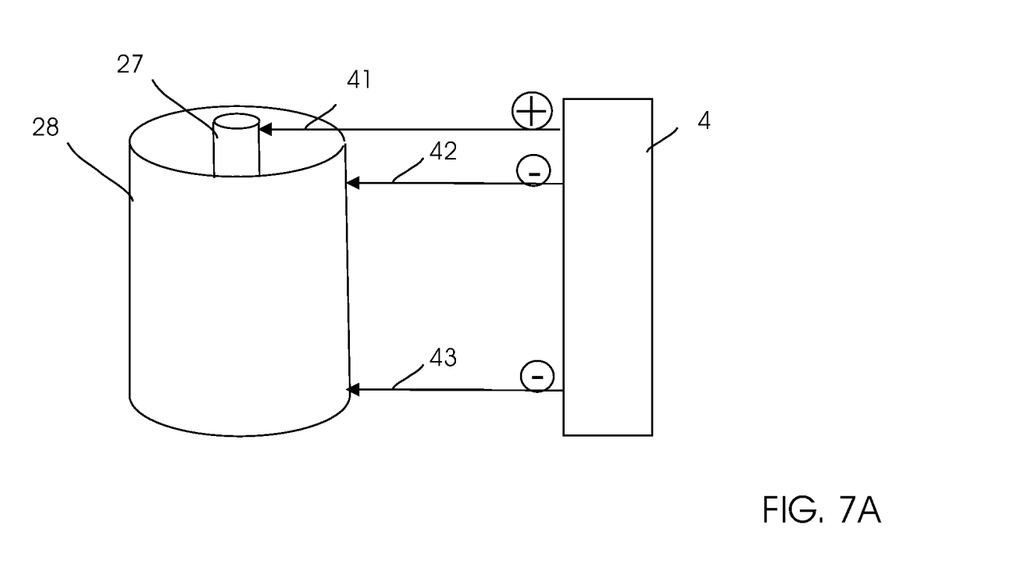
Figure 7B:
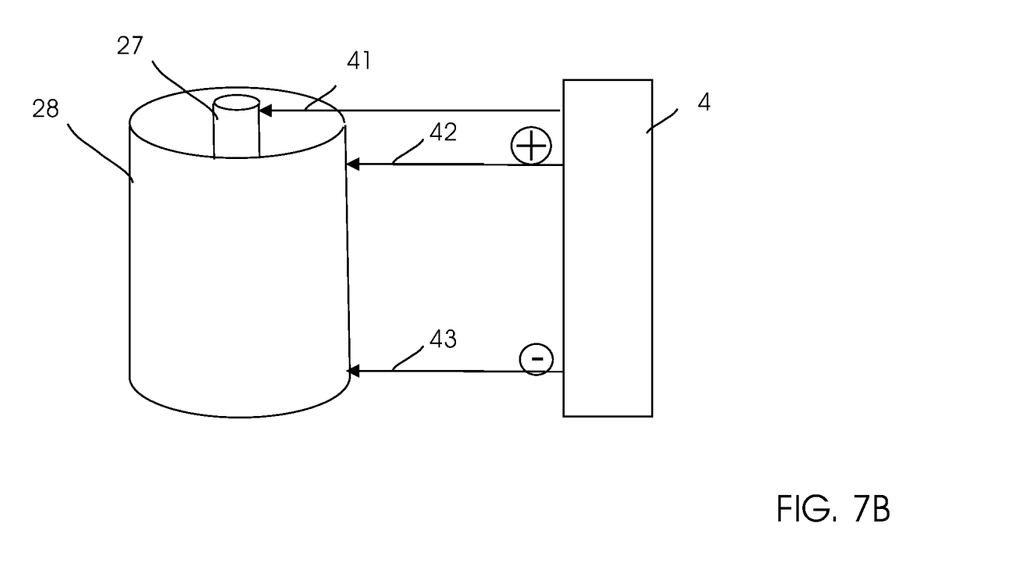

FIGS. 7A and 7B detail the structure and operation of a reactor and the applied electric voltages. FIG. 7A illustrates the applied voltage during the collection stage: The positive pole (+) is applied to the anode 27 through the connection to anode 41; the negative pole (−) is applied to the cathode 28 through a first connection to cathode 42 and a second connection to cathode 43. The voltage is generated in a electrical power supply 4.

The process of dissolving the accumulated calcium carbonate back into the permeate without using acid is controlled by the amperage supplied to the poles. The dissolving process is controlled by a pH meter. When reaches to the set point, the electricity supplied to the poles is being reduced in order to keep the required pH in the water, automatically.

A byproduct of this process is the $Cl_2$ producing. The $Cl_2$ is disinfecting the permeate and the conventional disinfecting process is remaining as a guard, to achieve the set point of disinfection.

FIG. 7B illustrates the applied voltage during the re-mineralization stage:
the anode 27 is left unconnected to a voltage supply.
A voltage is applied to the cathode 28 from the electrical power supply 4, between a first connection to cathode 42 and a second connection to cathode 43.

Figure 8A:
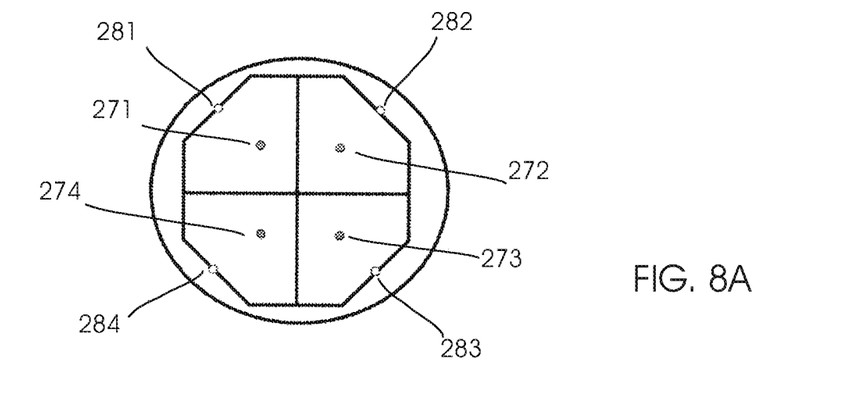
FIGS. 8A and 8B illustrate a top view and a front view of another embodiment of a reactor FIG. 9 details the control loops used with the desalination and re-mineralization apparatus FIG. 10 details the method of operation of the control loops.
Figure 8B:
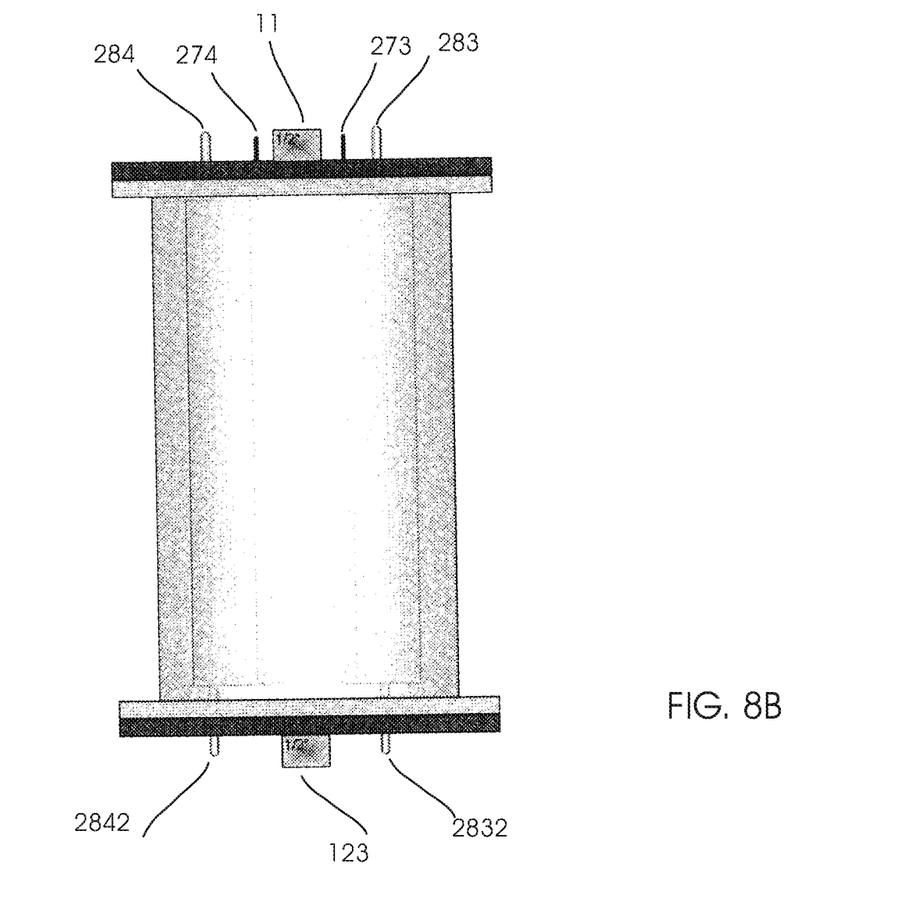

FIGS. 8A and 8B illustrate a top view and a front view, respectively, of another embodiment of a UET reactor.
The reactor is divided into four longitudinal partitions.
It includes anode connections 271, 272, 273, 274 to four anodes and cathode connections (upper part) 281, 282, 283, 284 to four cathodes.
There also are (see FIG. 8B) cathode connections (lower part) such as 2842, 2832 to four cathodes.
The reactor further includes a water inlet 11 and a water outlet 123.

Figure 9:
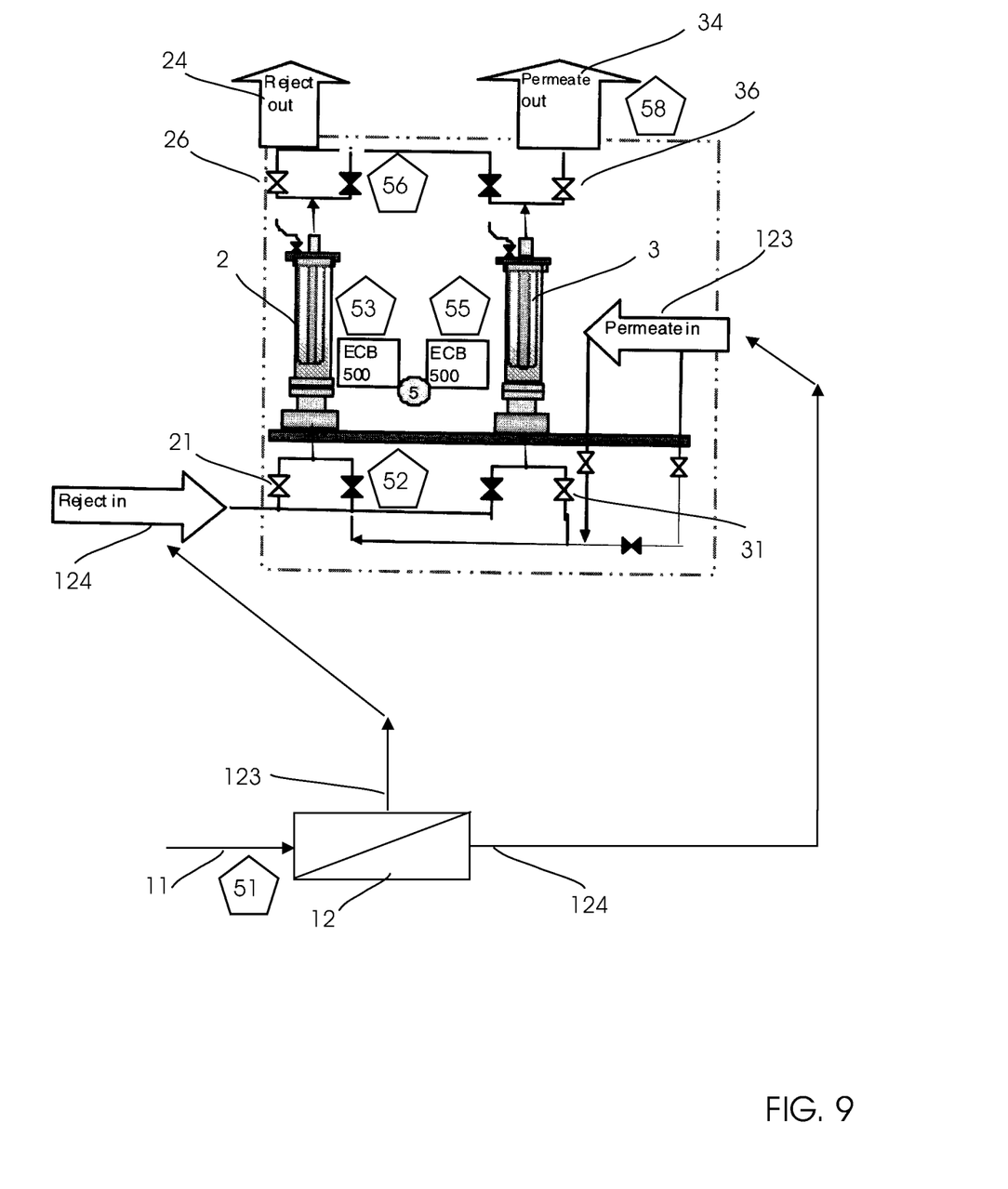

FIG. 9 details the control loops used with the desalination and re-mineralization apparatus, including:
water in flow rate control 51
inlet valves control 52—control which UET reactor will be supplied with
reject water and which one—with permeate water.
electric voltage—rate of lime accumulation on cathode 53
electric voltage—rate of lime dispensing into water 55
outlet valves control 56—control whose UET reactor output will be coupled to the reject water outlet, and which one—to the permeate water outlet; disinfectant concentration control loop 58

Figure 10:
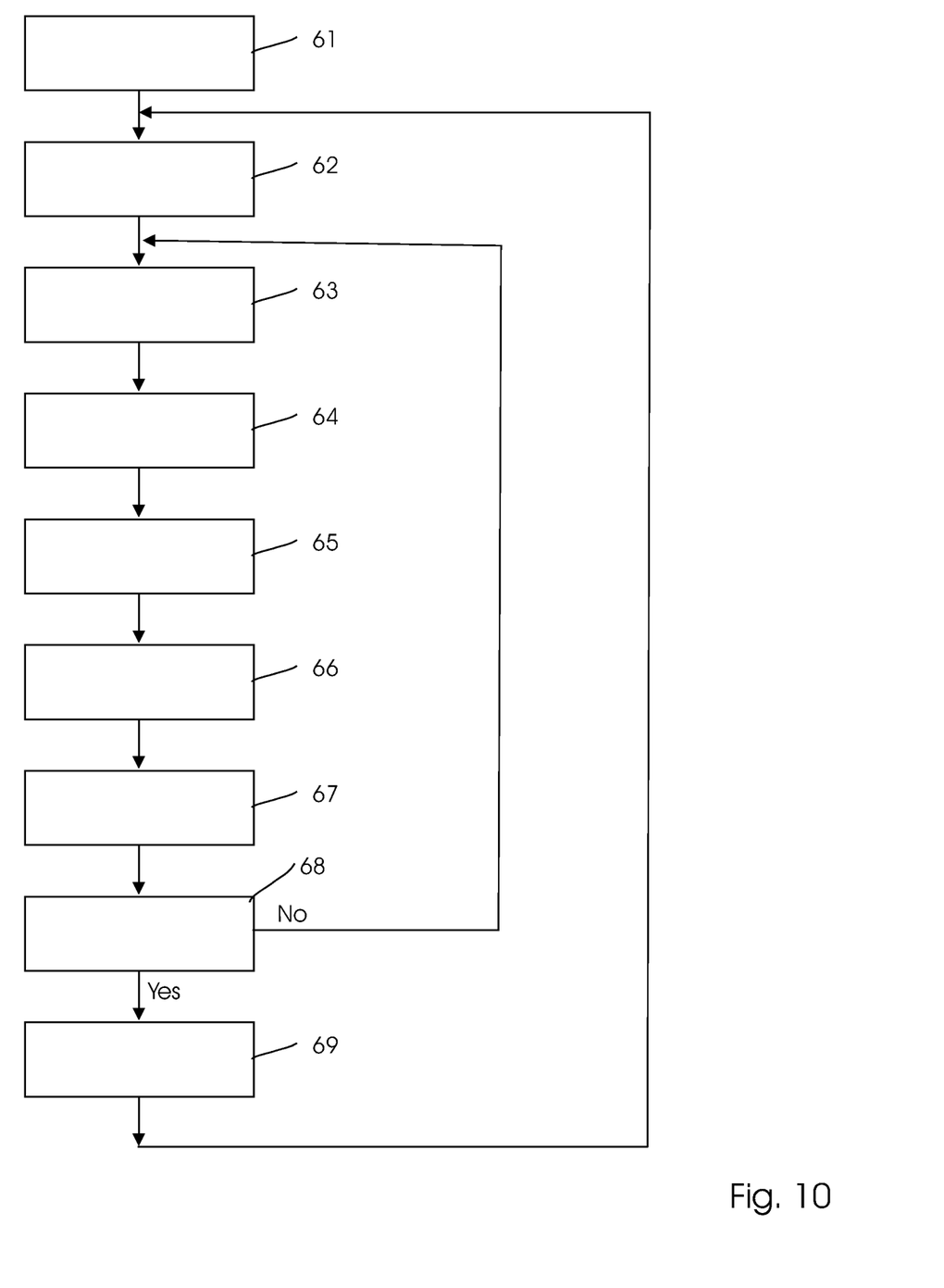

FIG. 10 details the method of operation of the control loops, including:
a. init parameters: water flow rate, system structure, required pH, required disinfectant concentration, other parameters 61
starting system initial activities
b. start one cycle 62
set inlet valves, outlet valves;
start measuring one cycle: time, resistance
c. set, control flow rate of water in 63
d. apply electric voltages to two UET reactors 64
e. control collection reactor voltage 65
f. control dispensing reactor voltage 66
g. control disinfectant concentration 67
measure disinfectant concentration in the permeate output supply, and supply additional disinfectant in the required amount to achieve the required level; this in an automatic control loop performed continuously (a sampled, discrete time, computer-controlled system can be used for all the control loops.)
h. cycle ended? 68
A cycle duration may be defined by various parameters or a combination thereof, for example: a preset time interval; when the collecting reactor is full; when
the resistance of the collected lime achieves a predefined value, etc.
i. set parameters for new cycle; 69
the two UET reactors to exchange roles.
The actual exchange can be performed in step (62) accordingly.

It will be recognized that the foregoing is but one example of an apparatus and method within the scope of the present invention and that various modifications will occur to those skilled in the art upon reading the disclosure set forth hereinbefore.

INDUSTRIAL APPLICABILITY

The present invention applies to a pair of UET reactors (UET—Universal Environmental Technology), which can simultaneously be used in a continuous automated process: a first reactor collects lime from the reject stream; a second reactor dispenses lime into the permeate stream, to re-mineralize it.

This is a technology-related invention, with a clearly defined implementation in hardware.

Thus, after a certain time period, the functions of the reactors is interchanged: now the first reactor, which has already collected enough lime, is used to dispense it into the permeate stream; the second reactor, having been depleted of lime, is placed in the reject stream so it can collect lime again.

The process can continuously supply potable water, where the pair of UET reactors interchange functions cyclically.

A set of inlet valves guide the permeate stream to one reactor and the reject stream to the other reactor, or vice versa (during a subsequent cycle).

A set of outlet valves guide the output of one reactor to the system permeate out and the output of the other reactor to the system reject out, or vice versa (during a subsequent cycle).

According to yet another aspect of the invention, electrical energy is used to facilitate both processes: the collection of lime in one UET reactor, and the simultaneous dispensing of lime into the permeate water in the other reactor.

The invention claimed is:

1. A system for re-mineralization of potable water, the system used in a system for generating the potable water by water desalination, wherein the system for generating the potable water uses a reverse osmosis filter and has a product outlet and a reject outlet, the system for re-mineralization of the potable water comprising:

two reactors comprising a first reactor and a second reactor, the first reactor configured to collect lime or calcium carbonate from a stream out of the reject outlet in a first cycle, and configured to dispense said collected lime or calcium carbonate to a permeate stream out of the product outlet in a second cycle;

the second reactor configured to dispense lime or calcium carbonate into the permeate stream during the first cycle and to collect lime or calcium carbonate from a stream out of the reject outlet during the second cycle, wherein a DC voltage sufficient to separate water into hydrogen (H+) ions and hydroxyl (OH−) ions is applied (i) during the second cycle across a cathode of the first reactor, said first reactor dispensing lime or calcium carbonate during the second cycle and (ii) during the first cycle across a cathode of the second reactor, said second reactor dispensing lime or calcium carbonate during the first cycle.

2. The system for re-mineralization of the potable water according to claim 1, wherein the first reactor has an output to a product water system outlet of the system for re-mineralization, and wherein the second reactor has an output to a reject water system outlet of the system for re-mineralization.

3. The system for re-mineralization of the potable water according to claim 1, wherein the system for re-mineralization is further configured to interchange, after a certain time period, a function of the first reactor with a function of the second reactor, so that the first reactor, which has already collected lime during the first cycle, is used to dispense it into the permeate stream during the second cycle; and the second reactor, having been depleted of lime or calcium carbonate during the first cycle, collects lime or calcium carbonate from the stream out of the reject outlet during the second cycle.

4. The system for re-mineralization of the potable water according to claim 1, further comprising a set of inlet valves configured to guide the permeate stream to one reactor of the two reactors and the stream out of the reject outlet to the other reactor of the two reactors, or vice versa (during a subsequent cycle).

5. The system for re-mineralization of the potable water according to claim 1, further comprising a set of outlet valves configured to guide the output of one reactor of the two reactors to the permeate stream out of the product outlet and the output of the other reactor of the two reactors to the stream out of the reject outlet, or vice versa (during a subsequent cycle).

6. The system for re-mineralization of the potable water according to claim 1, wherein the two reactors are configured such that one of the two reactors uses electrical energy to facilitate collection of lime while the other of the two reactors dispenses lime into the permeate stream.

7. The system for re-mineralization of the potable water according to claim 6, wherein the system for re-mineralization is further configured to collect lime by applying a DC (direct current) voltage between an anode and a cathode in whichever of the two reactors is functioning as the reactor for collecting lime.

8. The system for re-mineralization of the potable water according to claim 6, wherein the system for re-mineralization is further configured to dispense lime, by applying a DC voltage across the cathode of whichever of the two reactors is functioning as the reactor for dispensing lime.

9. The system for re-mineralization of the potable water according to claim 1, wherein the two reactors are configured to dissolve accumulated calcium carbonate in permeate water without using acid such that the dissolution is controlled by an amperage supplied to poles in the reactors, wherein when the pH reaches a set point, the electricity supplied to the poles is reduced in order to maintain pH a required pH of permeate water in the reactors, automatically.

10. The system for re-mineralization of the potable water according to claim 9, wherein the system for re-mineralization is further configured to produce $Cl_2$ as a byproduct of the dissolution, and to use the $Cl_2$ to disinfect the permeate.

* * * * *